United States Patent [19]

Strader

[11] 4,114,938
[45] Sep. 19, 1978

[54] GUTTER CLEANING DEVICE

[76] Inventor: M. Lane Strader, 910 Hern St., Greensboro, N.C. 27405

[21] Appl. No.: 827,798

[22] Filed: Aug. 25, 1977

[51] Int. Cl.² .................... B25J 1/00; E04D 13/06
[52] U.S. Cl. ............................................ 294/19 R
[58] Field of Search ................ 294/11, 19 R, 22, 23, 294/50.8, 30, 106; 56/332, 333

[56] References Cited

U.S. PATENT DOCUMENTS

| | | | |
|---|---|---|---|
| 2,720,409 | 10/1955 | Griffith | 294/19 R |
| 2,896,239 | 7/1959 | Bugbird | 294/19 R X |
| 3,972,552 | 8/1976 | Earp | 294/19 R |
| 4,057,276 | 11/1977 | Currie | 294/19 R |

Primary Examiner—Johnny D. Cherry

[57] ABSTRACT

A device for removing leaves and debris from gutters which may be operated from a ground position includes an elongated pole and a pair of selectively retractible gripping arms pivotally attached to the upper end. The gripping arms or blades are of a blade-like, rectangular configuration having at least one serrated grasping edge. The arms are selectively moved from an opened to a closed position by means of a control device activated by the operator at the lower end of the pole. Further, the angle at which the gripping arms depend from the elongated pole is generally acute or less than perpendicular to the longitudinal axis of the pole. Such angle is adjustable to facilitate reaching the gripping arms into gutters of various heights and configurations.

5 Claims, 2 Drawing Figures

GUTTER CLEANING DEVICE

BACKGROUND OF THE INVENTION

The problem of maintaining and cleaning gutters has existed since the advent of the gutter. Yet the most successful solution remains in the manual approach; i.e., climbing up on a ladder and removing the debris and leaves by hand. However, for many this type of maintenance is at best difficult or inconvenient, and in many cases it is impossible. Some people are physically incapable of climbing a ladder and performing the cleaning process. For these people the most logical, and frequently the only, approach is to hire someone to periodically clean out the gutters. The expense of hiring maintenance personnel is not small but heretofore there has been little alternative.

Apparatus for cleaning gutters is not readily available. Although there are several types of overhead grappling devices, fruit pickers, and other types of overhead article handlers and retrievers, an investigation into these devices proved that they were not a satisfactory means for grasping and removing leaves or other debris from overhead gutters. Some of them could possibly be used from a ladder position but none were adequate to clean the gutters from a ground position.

Construction design and location of gutters necessitates an overhead retriever which has gripping arms extending downwardly at a generally acute angle so that the arm may be lifted over the gutter edge, then downwardly into the trough. Those devices which have gripping arms extending substantially parallel to or at an obtuse angle with the pole will not work, because when extended up to and over the gutter, there is no way to move the arms at an angle into the gutters for removal of debris. Therefore the only way to apply these known devices to the maintenance of gutters is in conjunction with a ladder whereby one must climb up to a height allowing the operator to extend the retriever down into the gutter for removal of debris.

SUMMARY OF THE PRESENT INVENTION

The present invention is directed to an overhead retrieving device which is used to remove leaves and debris from gutters and is operated from a ground position. The gutter cleaning device herein described eliminates the necessity of using ladders to reach the gutter and thereby enables many homeowners to clean their gutters themselves and spare the expense of hiring outside maintenance personnel.

A preferred embodiment of the present invention includes a pair of serrated blade-like, retractible gripping arms or blades mounted on one end of an elongated, preferably extensible support pole. The gripping arms are mounted in relation to the longitudinal axis of the support pole at an angle generally less than 90° although the precise angle is somewhat adjustable in a preferred embodiment.

The extension pole is preferably telescopically designed so that the length may be adjusted for reaching gutters of various heights. The gripping blades are opened and closed by a control means operated from the lower end of the pole.

One mechanism which may be used for mounting the gripping arms on the extension pole includes a pair of activating rods or bails, each having an elongated center section with a generally angularly extending, somewhat shorter, segment on each end thereof. The longer, mid-segment of each bail is mounted for pivotal movement against diametrically opposite sides of the forward end of the extension pole. The forward, perpendicular segment of each bail is mounted to the upper end of one of the gripping arms and the rear segment is connected to a control line used to activate and retract the pair of gripping arms. A leaf spring is connected to each of the rear segments for normally biasing the blades to the open position.

In use the retriever pole is adjusted to the length desired, manually extending up over the gutter with the opened gripping arms suspended downwardly from the pole in position over the leaves and debris. As the gripping arms are lowered into the gutter the lower, serrated edges of the blades aid in grasping the debris, and as the control means is activated, the arms retract to a closed position and the leaves and debris are lifted out of the gutter.

It is therefore an object of the present invention to provide a tool for use by an operator on the ground in removing leaves and debris from overhead gutters, alleviating the necessity of using a ladder.

It is also an object of the present invention to provide a gutter cleaning device which is adjustable in length to reach gutters of various heights.

A further object of the present invention is the provision of a gutter cleaning device having gripping arms which are adjustably mounted for reaching into awkwardly positioned or constructed gutters.

Other objects and advantages of the present invention will become apparent to those skilled in the art as the following detailed description is studied in conjunction with the following drawings of which:

FIG. 1 is an environmental perspective view of the present invention in use; and FIG. 2 is an enlarged perspective view of the gripping and control portions of the present invention according to a preferred embodiment.

DETAILED DESCRIPTION OF A PREFERRED EMBODIMENT

Figure 1:
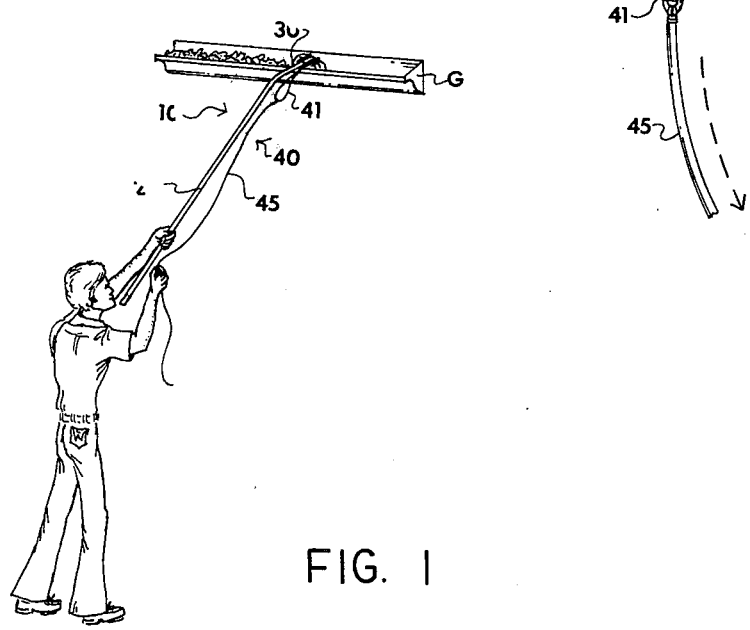

Turning now to a discussion of the drawings FIG. 1 illustrates the gutter cleaning device 10 in use. The device includes in general an elongated pole 20, a debris gripping portion 30, and control means 40 which may be operated by a person on the ground or at a lower level.

The pole 20 is preferably made to be extensible by a plurality of fitted segments 22 cooperatively engaged, or may include telescoping segments so that the pole 20 may be adjusted to any desired length for reaching gutters of various heights. Alternatively, when the retriever is not in use the cylindrical segments may be separated, or alternatively slipped, one within another, into the shortest length for storage. The upper end of the uppermost segment is preferably bent at an angle of 20° to 30° to facilitate use of the device. Although a variety of materials may be used for constructing the extension pole, a lightweight, tough material such as aluminum is preferred. Other substances including some of the heavy duty, moldable plastic substances are acceptable.

At the uppermost end of the elongated pole 20 is the gripping or working portion 30 of the apparatus. This portion is more clearly illustrated in FIG. 2 and includes a pair of blade-like gripping arms 32, a pair of operating bails 34 which mount the arms to pole 20, a control line 40 and a leaf spring 42.

The gripping blades 32 are generally constructed of aluminum or other substantially rigid material. It is essential that the blades be rigid so that they do not bend or yield against the debris being picked up. Each gripping blade 32 is essentially of an elongated rectangular shape having an upper end used for mounting, and a lower end which has a serrated edge 33. The serrated edge 33 is angled inwardly from the plane of the blade 32 commencing at a point 33' increasing the grasping capabilities of the blades when they are closed.

Across the upper end of blades 32 are a plurality of holes 38 spaced apart, or alternatively an arcuate slot (not shown). These holes 38 or slot are used in conjunction with a more central opening (not visible in FIG. 2) for adjustably mounting the blades 32 to the bails 34 as more fully described below.

Operating bails 34 include a central segment 35 which is positioned in juxtaposed relation to and attached for rotation to the upper end of extension pole 20 by means of one or more clamps 25. The two bails are generally positioned in diametrically opposed sides of the pole. On each end of the aforesaid primary segment 35 are angularly extending segments 36,37.

A blade mounting segment or portion 36 is bent to extend angularly from the central segment 35. The segment 36 is preferably flattened and includes a pair of spaced holes therethrough which receive fasteners 39,39' for securing a gripping blade 32 thereto through a selected one of the holes 38 and the aforementioned central opening.

A control segment 37 is bent to extend substantially perpendicularly from the rearward end of the central segment 35. This segment 37 is fixed by welding or other suitable method to one of the leaves of a leaf spring 42 which has the central portion thereof around the pole 20 and normally biases the blades 32 through bails 34. The outer extremity of each control segment 37 has secured thereto one end of the control means 40 for operation of the bails.

Control means 40 in the illustrated embodiment includes a length of nylon or metallic cord or wire folded to form a loop 41 positioned rearwardly of the operating portion 30. The two ends of cord extending from loop 41 are threaded individually through a bilateral conduit or guide 43 with one length exiting through each opening 44,44'. The ends of the cording are then secured by knotting or other method to the outer ends of bail segments 37 at points "a". It should be recognized that the control means 40 and spring biased bails 35 are exemplary of only one way of activating the working portion. Various other techniques are also contemplated.

The gutter cleaning device is simple for anyone to operate and under most circumstances is the only tool necessary to clean gutters of leaves and other debris which collect throughout a year. As mentioned above, the extension pole segments 22 are either separable or telescopically connected. During use the segments 22 are extended outwardly or connected together to the length desired, at which point the segments 22 are locked into position by any one of several known devices.

Figure 2:
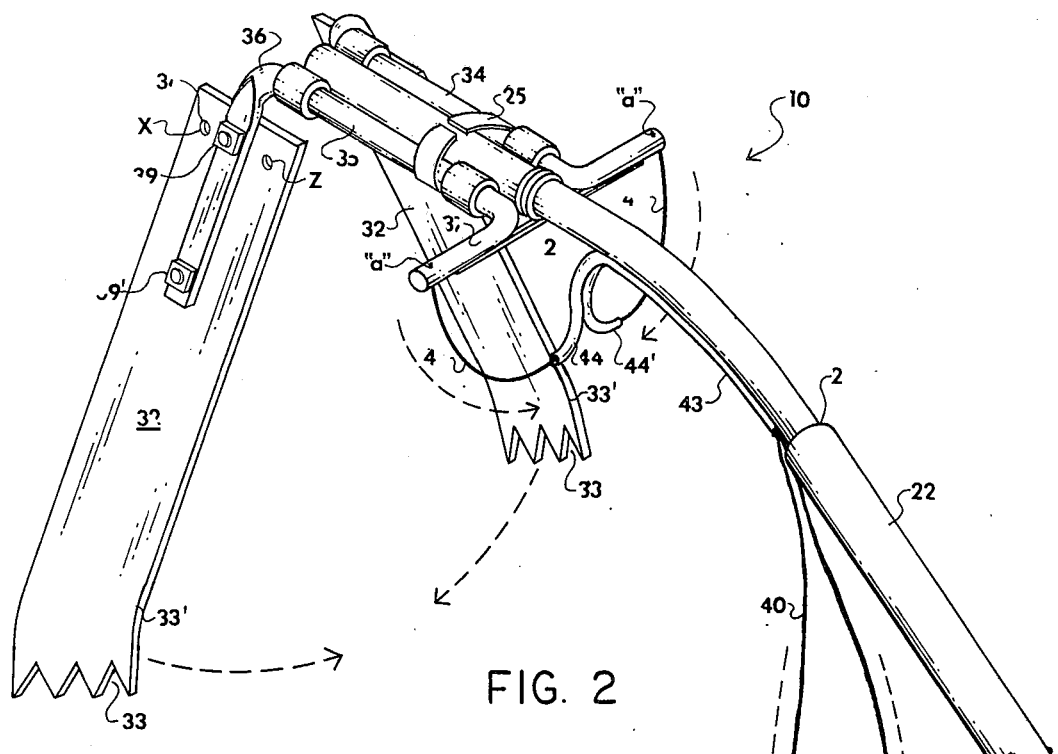

The correct angular relationship between the gripping blades 32 and the extension pole 20 is determined and any necessary adjustments made between blades 32 and segments 36. To adjust the angle of the blades the nut and bolt assembly 39 is tightened with the bolt through the selected hole or aperture 38 to hold the blade in place. As illustrated in FIG. 2, use of the centrally positioned aperture(s) 38 establishes a blade angle of just under 90° because of the bend in pole 22, which angular relationship has been proven most generally effective for getting the blades down into gutters of average heights. To increase the angle, for gutters of lesser height, it is a simple matter to remove nut and bolt 39 from the center one of apertures 28 and place it through the extreme forward aperture x. For higher gutters, the reverse is true; to decrease the angular relationship, move the nut and bolt 39 into the rearward aperture y. The screw or nut/bolt combination 39' nearer the center portion of blade 32 is not removed but is left in place to serve as a pivot pin for angularly adjusting the fastener.

This capability of adjusting the angular relationship between the extension pole 20 and the gripping blades 32 is quite important though not critical to the invention. Although there are other ways to achieve the adjustability of the angle, the aforedescribed method has been used and is effective. However, it should be understood that the invention is not limited to this nut/bolt 39 and pivot screw 39' arrangement.

As the retriever is raised into position over the gutter G as shown in FIG. 1 the control line 40 is left in a slack condition so that the gripping blades 32 are in an open position. The blades 32 are then lowered into the leaves and debris within the gutter and control loop 41 is pulled downwardly by means of an extension line 45. The downward motion of loop 41 draws the ends of the control line downward, which in turn overcomes the spring bias and rotates the bail 34 and the gripping blades 32 downward from their first, open position to a second, closed position. As the blades 32 are closed the leaves and debris are caught between the blades and may be lifted out of the gutter G. The handle 41 is then released whereby the bails 34 and blades 32 spring back to their open position and the leaves are released to be deposited in a collector for disposal.

While a preferred embodiment is shown and described hereinabove, it is obvious that various changes might be made without departing from the scope of the present invention as set forth in the following claims.

What is claimed is:
1. A device for removing leaves and debris from gutters from a ground position, said device comprising:
   a. an elongated extension pole including means for selectively extending said pole to one of a plurality of extended positions;
   b. a gripping means mounted at the upper end of said extension pole, said gripping means including:
      i. a pair of activating bails each having a primary segment rotatably attached in juxtaposed relation to the upper end of said extension pole, a mounting segment extending substantially perpendicularly from the forward end thereof, and a control segment extending substantially perpendicularly from the rearward end of each of said primary segments;
      ii. a pair of gripping blades substantially rectangular in shape, one of said gripping blades being mounted on each of said mounting segments in such a manner that said blades depend downwardly from said extension pole at an angle generally less than 90°;
      iii. means for adjusting the angle at which said gripping blades depend from said extension pole;

iv. control means for selectively moving said gripping blades from a first, open position to a second, closed position.

2. A gutter cleaning device according to claim 1 wherein each of said gripping blades include a serrated edge at the free end thereof.

3. A gutter cleaning device according to claim 1 wherein said means for adjusting the angle at which said gripping blades depend from said extension pole includes:
   a. a plurality of first apertures arranged across the upper edge of each of said gripping blades and a central aperture spaced outwardly from said first aperture;
   b. a fastening screw means extending through a selected one of said apertures and a mating hole said mounting segment and another fastening screw means extending through the central aperture and a mating second hole in said mounting segment whereby the angle between the pole and said gripping blades will increase or decrease according to the first aperture selected for mounting said blade to said aperture.

4. A tool for cleaning gutters from a ground position comprising:
   a. an elongated pole having a longitudinal axis;
   b. a pair of gripping blades pivotally attached to one end of said pole and extending outwardly therefrom at an angle less than 90° with respect to said longitudinal axis, said blades being movable in an arcuate path about said pole between an open position with the free ends spaced from each other and a closed position with the free ends substantially adjacent each other;
   c. said pair of gripping blades being attached to said pole by a bail which includes a central rod segment pivotally attached in juxtaposed relation to said pole, an upper segment extending angularly with respect to one end of said central segment and including mounting means for securing said blade thereto and a lower segment extending angularly with respect to the other end of said central segment and including connecting means for receiving one end of said control means, the lower segments of said bails being connected together by a leafspring which normally forms said biasing means; and
   d. a control means operable from a position adjacent the other end of said pole for moving said blades between said closed and open positions.

5. The tool according to claim 4 wherein said control means includes a cord having one end connected to the free end of one of the lower segments and the other end connected to the free end of the other of the lower segments thereby forming a loop extending toward the other end of said pole, whereby a pulling on said loop pulls the lower segments of said bails together thereby moving said blades from the open to the closed position.

* * * * *